Patented Feb. 9, 1954

2,668,825

UNITED STATES PATENT OFFICE 2,668,825

S-(ETHYLXANTHOYL) N,N-DIETHYLAMIDO-THIOPHOSPHORIC CHLORIDE

Henry Tolkmith, Midland, Mich., assignor to The Dow Chemical Company, Midland, Mich., a corporation of Delaware No Drawing. Application April 21, 1953, Serial No. 350,238

1 Claim. (Cl. 260—455)

This invention is directed to S-(ethylxanthoyl) N,N-diethylamidothiophosphoric chloride of the formula

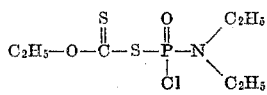

This compound is a viscous oil, somewhat soluble in many organic solvents and substantially insoluble in water. It is of value as an intermediate for the preparation of more complex organic derivatives and as a toxic constituent of parasiticide compositions.

The new compound may be prepared by reacting one molecular proportion of an alkali metal ethylxanthate with one molecular proportion of diethylamidophosphoric dichloride of the formula

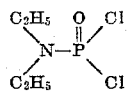

in an inert organic solvent such as benzene. In practice sodium ethylxanthate is preferably employed as the alkyli metal xanthate reactant.

In carrying out the reaction of sodium ethylxanthate and diethylamidophosphoric dichloride are dispersed in the solvent and the resulting mixture heated with stirring for a period of time at a temperature of from 40° to 80° C. Temperatures substantially in excess of 80° C. for any appreciable period of time should be avoided as the desired product has a tendency to decompose at such temperature. Upon completion of the reaction, the reaction mixture may be filtered and the filtrate concentrated by distillation under reduced pressure at gradually increasing temperatures up to a temperature of 80° C. to separate low boiling constituents and to obtain as a residue the desired S-(ethylxanthoyl) N,N-diethylamidothiophosphoric chloride.

The diethylamidophosphoric dichloride employed as a starting material in the above-described method may be prepared by reacting phosphorus oxychloride (POCl₃) with diethylamine. Satisfactory yields are obtained when employing two molecular proportions of the amine with each proportion of phosphorus oxychloride. The reaction takes place readily at temperatures of from 0° to 40° C. The reaction is somewhat exothermic, the temperature being controlled by regulation of the rate of contacting the reactants as well as by the addition or subtraction of heat if required. Following the reaction, the crude mixture may be filtered and the filtrate fractionally distilled under reduced pressure to separate the desired product. The latter is a water-like liquid boiling at 100° C. at 15 millimeters pressure.

In the representative preparation, 45 grams (0.31 mole) of sodium ethylxanthate was added to 60 grams (0.31 mole) of diethylamidophosphoric dichloride dispersed in 150 milliliters of benzene and the resulting mixture heated with stirring for 3½ hours at a temperature of 60° C. At the end of this period, the reaction product was diluted with an equal volume of diethyl ether and the resulting mixture filtered. The filtrate was then concentrated by distillation under reduced pressure to a temperature up to 60° C. to obtain as a residue 69 grams of an S-(ethylxanthoyl) N,N - diethylamidothiophosphoric chloride product. The latter was an oily liquid having a density of 1.195 at 18° C.

The new S-(ethylxanthoyl) N,N-diethylamidothiophosphoric chloride product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

In representative operations against flies and cockroaches, 100 percent kills of these pests are obtained with dust compositions containing 4.5 percent by weight of the toxic N,N-diethylamidothiophosphoric chloride.

This is a continuation in part of my copending application Serial No. 203,767, filed December 30, 1950.

I claim:

S-(ethylxanthoyl) N,N-diethylamidothiophosphoric chloride.

HENRY TOLKMITH.

No references cited.